United States Patent
Ramanan et al.

(10) Patent No.: US 7,978,719 B2
(45) Date of Patent: Jul. 12, 2011

(54) DYNAMICALLY ASSIGNING ENDPOINT IDENTIFIERS TO NETWORK INTERFACES OF COMMUNICATIONS NETWORKS

(75) Inventors: Aruna V. Ramanan, Poughkeepsie, NY (US); Nicholas P. Rash, Poughkeepsie, NY (US); Karen F. Rash, legal representative, Poughkeepsie, NY (US); Alison B. White, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 11/149,880

(22) Filed: Jun. 10, 2005

(65) Prior Publication Data

US 2006/0280125 A1 Dec. 14, 2006

(51) Int. Cl.
*G09G 5/00* (2006.01)
*H04L 12/28* (2006.01)
*H04L 12/56* (2006.01)
*G06F 15/16* (2006.01)
*G06F 15/173* (2006.01)
*G06F 15/177* (2006.01)

(52) U.S. Cl. ........ 370/419; 345/619; 370/254; 370/255; 370/351; 709/203; 709/220; 709/227; 709/230; 709/239; 709/242; 709/245; 709/248; 709/250

(58) Field of Classification Search ................. 370/254, 370/255, 351, 395.2; 709/203, 220, 230, 709/239, 242, 245, 248, 250, 254, 227; 345/619
See application file for complete search history.

(56) References Cited

U.S. PATENT DOCUMENTS

| | | | |
|---|---|---|---|
| 4,987,536 A | 1/1991 | Humblett | |
| 5,150,360 A | 9/1992 | Perlman et al. | |
| 5,253,248 A | 10/1993 | Dravida et al. | |
| 5,355,364 A | 10/1994 | Abali | ............... 370/54 |
| 5,418,779 A | 5/1995 | Yemini et al. | |
| 5,430,729 A | 7/1995 | Rahnema | |
| 5,453,978 A | 9/1995 | Sethu et al. | ............... 370/60 |
| 5,467,345 A | 11/1995 | Cutler, Jr. et al. | |
| 5,521,910 A | 5/1996 | Matthews | |
| 5,535,195 A | 7/1996 | Lee | |

(Continued)

FOREIGN PATENT DOCUMENTS

JP 3112238 5/1991

(Continued)

OTHER PUBLICATIONS

First Office Action dated Oct. 24, 2008. U.S. Appl. No. 11/141,185, filed May 31, 2005.

(Continued)

*Primary Examiner* — Hong Cho
*Assistant Examiner* — Lonnie Sweet
(74) *Attorney, Agent, or Firm* — Steven Chiu, Esq.; Kevin P. Radigan, Esq.; Heslin Rothenberg Farley & Mesiti P.C.

(57) ABSTRACT

Endpoint identifiers are dynamically assigned to network interfaces, in response to a change in physical connection. When a physical connection associated with a network interface is changed, such as a cable coupling the network interface to an endpoint is moved from one location to another location, a new endpoint identifier is assigned to the network interface. The new endpoint identifier is based on the location of the new endpoint.

19 Claims, 9 Drawing Sheets

U.S. PATENT DOCUMENTS

| | | | |
|---|---|---|---|
| 5,572,512 | A | 11/1996 | Cutler, Jr. et al. |
| 5,596,722 | A | 1/1997 | Rahnema |
| 5,812,549 | A | 9/1998 | Sethu .......................... 370/389 |
| 5,841,775 | A | 11/1998 | Huang |
| 5,884,090 | A | 3/1999 | Ramanan et al. ........ 395/800.13 |
| 6,021,442 | A | 2/2000 | Ramanan et al. ............. 709/238 |
| 6,173,355 | B1 | 1/2001 | Falik et al. |
| 6,202,089 | B1 | 3/2001 | Juster ............................ 709/219 |
| 6,314,084 | B1 | 11/2001 | Kahale et al. |
| 6,498,778 | B1 | 12/2002 | Cwilich et al. |
| 6,763,380 | B1 | 7/2004 | Mayton et al. |
| 6,799,210 | B1 | 9/2004 | Gentry et al. ................. 709/223 |
| 7,260,636 | B2 * | 8/2007 | Blumenau et al. ............ 709/227 |
| 7,334,047 | B1 * | 2/2008 | Pillay-Esnault ............. 709/242 |
| 7,602,728 | B2 | 10/2009 | Adhikari et al. |
| 2002/0112067 | A1 | 8/2002 | Chang et al. .................. 709/232 |
| 2003/0115298 | A1 | 6/2003 | Baker ........................... 709/220 |
| 2003/0158968 | A1 | 8/2003 | Huart et al. ................... 709/245 |
| 2003/0225893 | A1 * | 12/2003 | Roese et al. .................. 709/227 |
| 2005/0180429 | A1 * | 8/2005 | Ghahremani et al. ... 370/395.21 |
| 2006/0268691 | A1 | 11/2006 | Ramanan |
| 2006/0274082 | A1 * | 12/2006 | Cochran et al. ............... 345/619 |

FOREIGN PATENT DOCUMENTS

WO WO 03/061243 A1 7/2003

OTHER PUBLICATIONS

Final Office Action dated Feb. 26, 2009. U.S. Appl. No. 11/141,185, filed May 31, 2005.

"Algorithm for random Selection of Shortest Path", IBM Technical Disclosure Bulletin, vol. 32, No. 6A, Nov. 1989, pp. 478-480.

"An Introduction to the New IBM eServer pSeries high Performance Switch," SG24-6978-00, Dec. 2003.

* cited by examiner

US 7,978,719 B2

DYNAMICALLY ASSIGNING ENDPOINT IDENTIFIERS TO NETWORK INTERFACES OF COMMUNICATIONS NETWORKS

TECHNICAL FIELD

This invention relates, in general, to communications networks, and in particular, to assigning endpoint identifiers to network interfaces of the communications network.

BACKGROUND OF THE INVENTION

One type of communications network is a switch network. Examples of switch networks are described in U.S. Pat. No. 6,021,442, entitled "Method And Apparatus For Partitioning An Interconnection Medium In A Partitioned Multiprocessor Computer System," Ramanan et al., issued Feb. 1, 2000; U.S. Pat. No. 5,884,090, entitled "Method And Apparatus For Partitioning An Interconnection Medium In A Partitioned Multiprocessor Computer System," Ramanan et al., issued Mar. 16, 1999; U.S. Pat. No. 5,812,549, entitled "Route Restrictions For Deadlock Free Routing With Increased Bandwidth In A Multi-Stage Cross Point Packet Switch," Sethu, issued Sep. 22, 1998; U.S. Pat. No. 5,453,978, entitled "Technique For Accomplishing Deadlock Free Routing Through A Multi-Stage Cross-Point Packet Switch," Sethu et al., issued Sep. 26, 1995; and U.S. Pat. No. 5,355,364, entitled "Method Of Routing Electronic Messages," Abali, issued Oct. 11, 1994, each of which is hereby incorporated herein by reference in its entirety.

In a switch network, switch cables are used to attach switches to adapters that are located within one or more nodes of the switch network. When a switch cable is attached to an adapter, an endpoint identifier is assigned to the adapter based upon its connection point in the network. If a different switch cable is attached to the adapter or the switch cable is moved from one location to another location, while the node is running, the adapter retains the previously assigned endpoint identifier.

The retaining of the endpoint identifier, when a change in physical connection has been made, has major drawbacks for the network. For instance, when the switch cable is moved, routes must be changed, not only on the affected adapter, but also on every other adapter in the system that wants to communicate with this endpoint. Further, to keep track of the cables and the endpoint identifiers, an endpoint map and server state information are needed to track the information. The ability to track the information in an accurate and timely fashion is difficult and error-prone.

Based on the foregoing, a need exists for an enhanced capability for assigning endpoint identifiers to adapters and/or other network interfaces.

SUMMARY OF THE INVENTION

The shortcomings of the prior art are overcome and additional advantages are provided through the provision of a method of assigning endpoint identifiers to network interfaces of a communications network. The method includes, for instance, having a network interface of a communications network with a first endpoint identifier assigned thereto; and dynamically assigning a second endpoint identifier to the network interface, in response to a change in a physical connection associated with the network interface.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a dynamic endpoint assignment capability is provided, in which a network interface (e.g., an adapter) receives a new endpoint identifier when a physical connection associated with the network interface is changed (e.g., moved). The endpoint identifier directly relates to where the network interface is connected to the network. The assigning of new endpoint identifiers in response to physical connection changes alleviates the routing changes that are associated with other endpoints trying to reach this destination. Only the routes of the local interface are updated.

Figure 1:
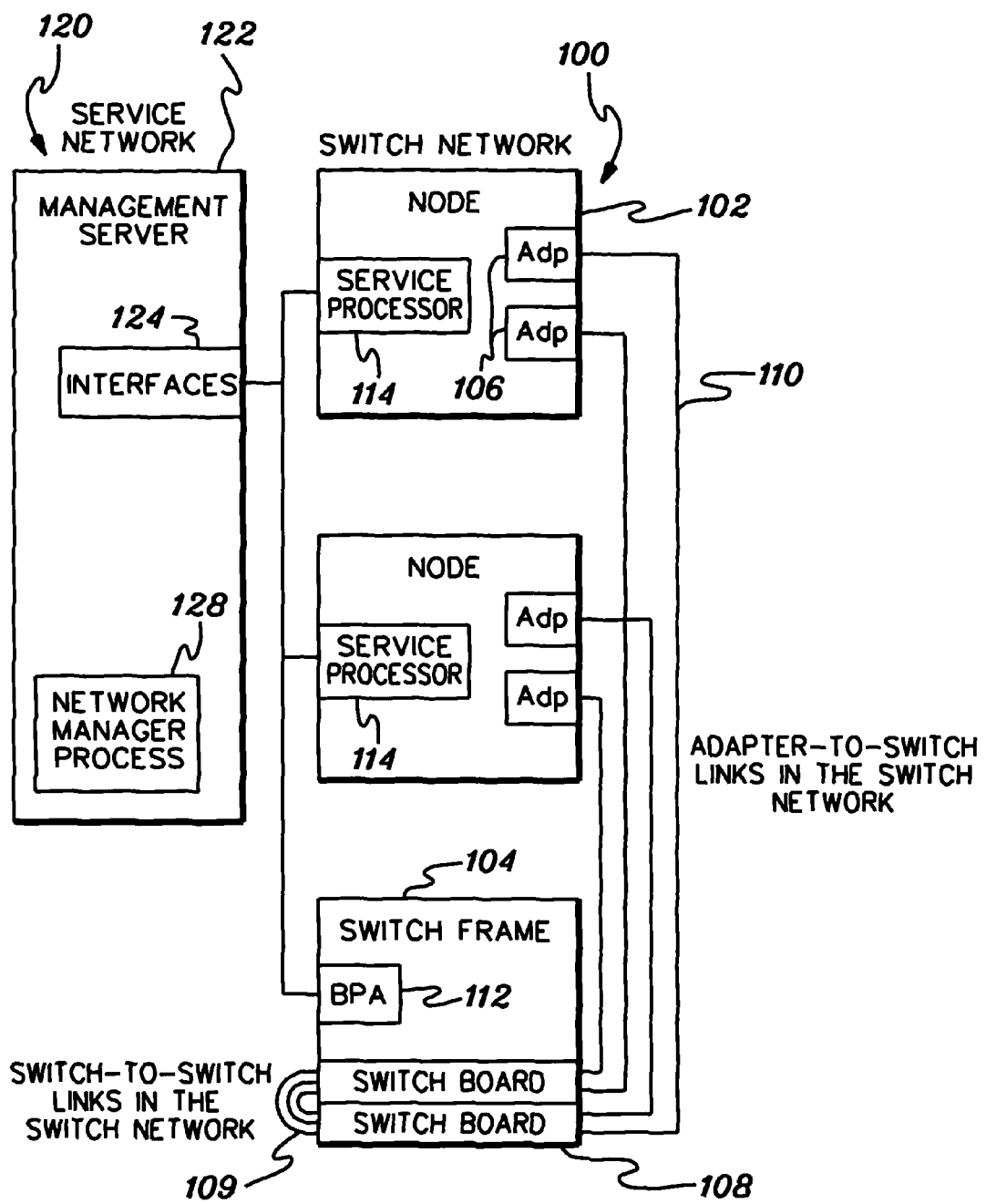
FIG. 1 depicts one example of a switch network coupled to a service network, in accordance with an aspect of the present invention.

One embodiment of a communications network incorporating and using one or more aspects of the present invention is described with reference to FIG. 1. A communications network 100 is, for instance, a switch network that may be optical, copper, phototonic, etc., or any combination thereof. As is known, a switch network is used in communicating between computing units (e.g., processors) of a system, such as a central processing complex. The processors may be, for instance, pSeries® processors or other processors, offered by International Business Machines Corporation, Armonk, N.Y. One switch network offered by International Business Machines Corporation is the High Performance Switch (HPS) network, an embodiment of which is described in "An Introduction to the New IBM eServer pSeries High Performance Switch," SG24-6978-00, December 2003, which is hereby incorporated herein by reference in its entirety. (IBM and pSeries are registered trademarks of International Business Machines Corporation, Armonk, N.Y., U.S.A. Other names used herein may be registered trademarks, trademarks or product names of International Business Machines Corporation or other companies.)

Switch network 100 includes, for example, a plurality of nodes 102, such as Power 4 nodes offered by International Business Machines Corporation, Armonk, N.Y., coupled to one or more switch frames 104. A node 102 includes, as an example, one or more adapters 106 coupling nodes 102 to switch frame 104. Switch frame 104 includes, for instance, a plurality of switch boards 108, each of which is comprised of one or more switch chips. Each switch chip includes one or more external switch ports, and optionally, one or more internal switch ports. A switch board 108 is coupled to one or more other switch boards via one or more switch-to-switch links 109 in the switch network. Further, one or more switch boards are coupled to one or more adapters of one or more nodes of the switch network via one or more adapter-to-switch links 110 of the switch network.

Although in the example described herein the switch boards are coupled to adapters, in other examples, the switch boards may be coupled to other network interfaces via interface-to-switch links in the switch network. An adapter is one example of a network interface.

Switch frame 104 also includes at least one bulk power assembly 112 coupling the switch frame to a service network 120. Similarly, a node 102 includes, for instance, one or more service processors 114 coupling the node to service network 120. The bulk power assembly may include a service processor. The service processors include logic used at initialization. In a further embodiment, one or more of the service processors or bulk power assemblies may be replaced with other types of links.

Service network 120 is an out-of-band network that provides various services to the switch network. In this particular situation, the service network is responsible for assigning endpoint identifiers and for creating the communications routes that are stored on the network adapters (or other interfaces). In one example, service network 120 includes a management server 122 having, for instance, one or more interfaces 124 (e.g., Ethernet adapters), which are coupled to one or more service processors 114 of nodes 102 and/or one or more bulk power assemblies 112 of switch frame 104. Management server 122 executes at least one network manager process 128 (also referred to herein as the network manager) that is responsible for assigning the endpoint identifiers and for determining the communication routes.

Figure 2:
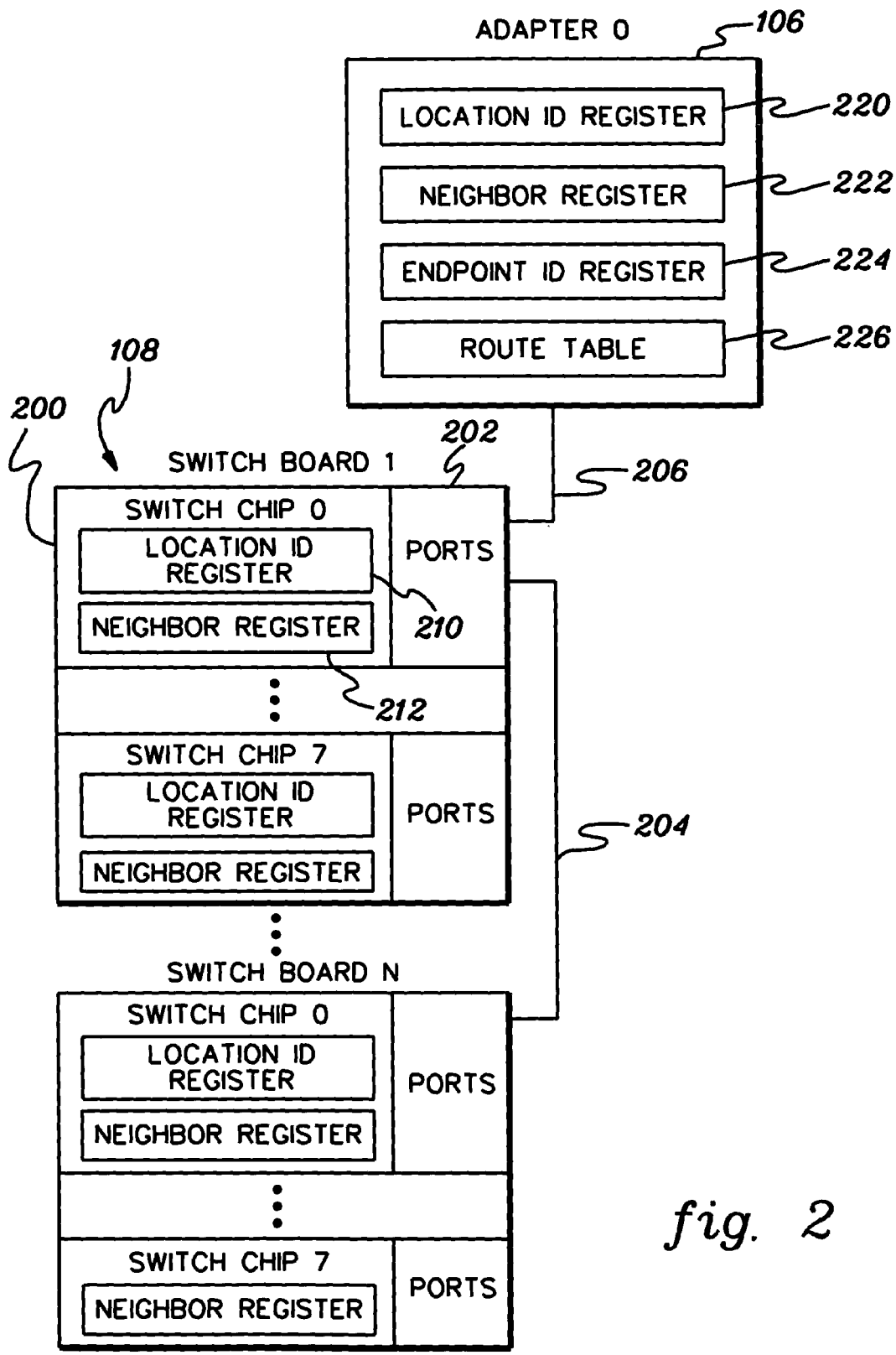
FIG. 2 depicts further details of various hardware components of the switch network of FIG. 1, in accordance with an aspect of the present invention.
Figure 3:
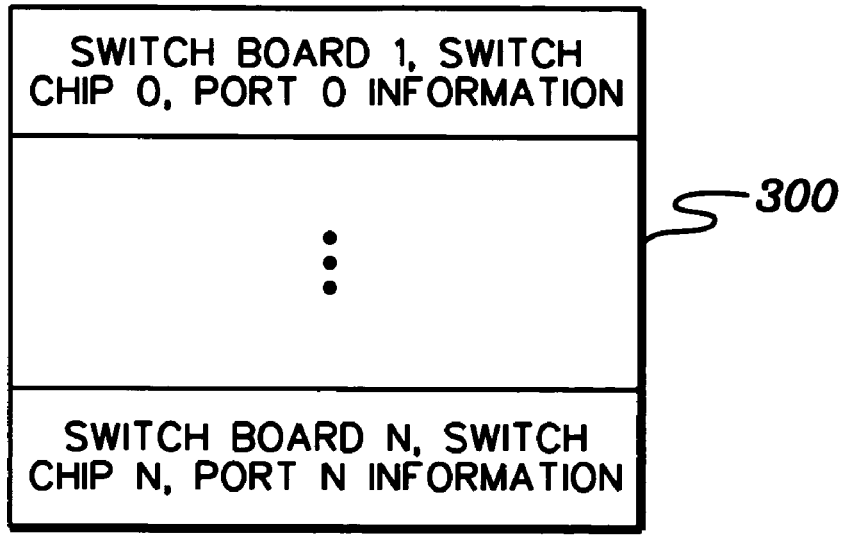
FIG. 3 depicts one embodiment of a link data structure that includes information associated with the switch boards of the switch network, in accordance with an aspect of the present invention.

Further details regarding the switch network, and in particular, the switch boards and adapters are described with reference to FIG. 2. Referring to FIG. 2, a switch board 108 includes a plurality of switch chips 200 (e.g., 8) connected internally (onboard) to the other switch chips on that board via switch chip ports 202 (e.g., ports 4-7, as one example). Further, each switch chip has a plurality of external ports (e.g., ports 0-3) used to connect the switch board to one or more other switch boards as depicted at 204 and/or or to one or more adapters 106, as depicted at 206.

Each switch chip includes one or more registers used to hold information. In this one example, a switch chip 200 includes a location id register 210 used to store location information for the switch chip, including frame identifier, cage or slot number within the frame, chip identifier and network identifier, as examples. The frame id, cage or slot number and chip id are stored in the location id register during, for example, initialization of the switch by the switch microcode. The network identifier is stored during initialization by the network manager, in one example. Switch chip 200 also includes one or more neighbor registers 212 used to store location information for the one or more adapters or one or more switch chips to which it is connected. In one embodiment, there is one neighbor register for each external port of the switch chip. However, in a further embodiment, one register holds the information for each external port of the chip.

Similarly, each adapter also includes one or more registers to hold information. For example, adapter 106 includes a location identifier register 220 used to include location information for the adapter, such as frame identifier, cage or slot number within the frame, and adapter number within, for instance, the central processing complex in which the adapter is located; a neighbor register 222 used to store location information associated with the switch port to which it is connected; and an endpoint identifier register 224 used to hold the endpoint identifier assigned to the adapter. In one example, the endpoint identifier register holds the most current endpoint id, which dynamically changes, in accordance with an aspect of the present invention. In a further embodiment, however, the register can hold multiple ids (e.g., previous and current ids). Adapter 106 also includes a route table 226 that stores the available communications routes for the adapter. The endpoint identifier is the index into the route table.

Information about each port of the switch network is maintained in a data structure, such as a table 300, referred to herein as a link table. The link table is maintained, for instance, within storage of the network manager process and is built at each initialization of the process. The information in the link table includes, as one example, port location information, current neighbor of the port and the static endpoint identifier associated with the switch port.

Figure 4:
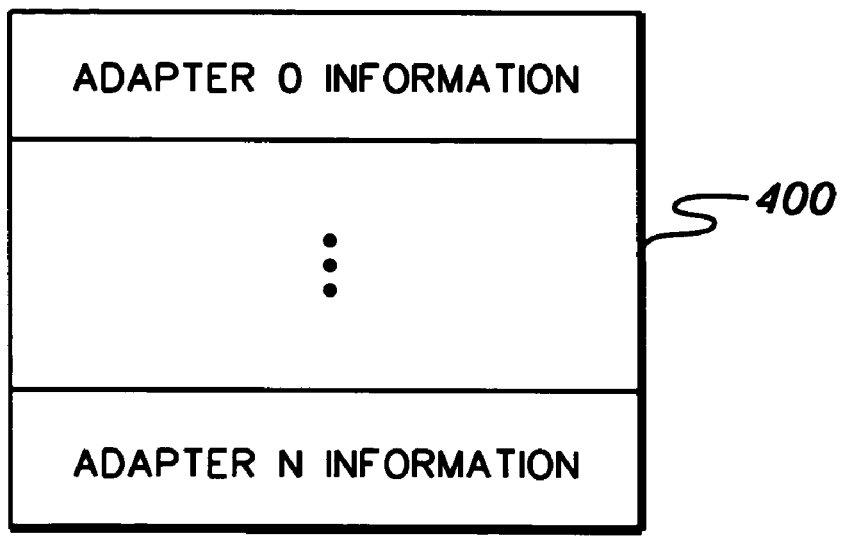
FIG. 4 depicts one embodiment of a device data structure that includes information regarding adapters of the switch network, in accordance with an aspect of the present invention.

Additionally, information regarding each adapter of the network is maintained in a data structure 400 (FIG. 4), such as a table, referred to herein as a device table. This table is also maintained, in this embodiment, at and by the network manager process. The table includes, for example, the dynamic endpoint identifier for each adapter of the node. This identifier is dynamic, since it changes, in response to changes in a physical connection associated with the adapter (e.g., cable replugged into a different port).

Figure 5:
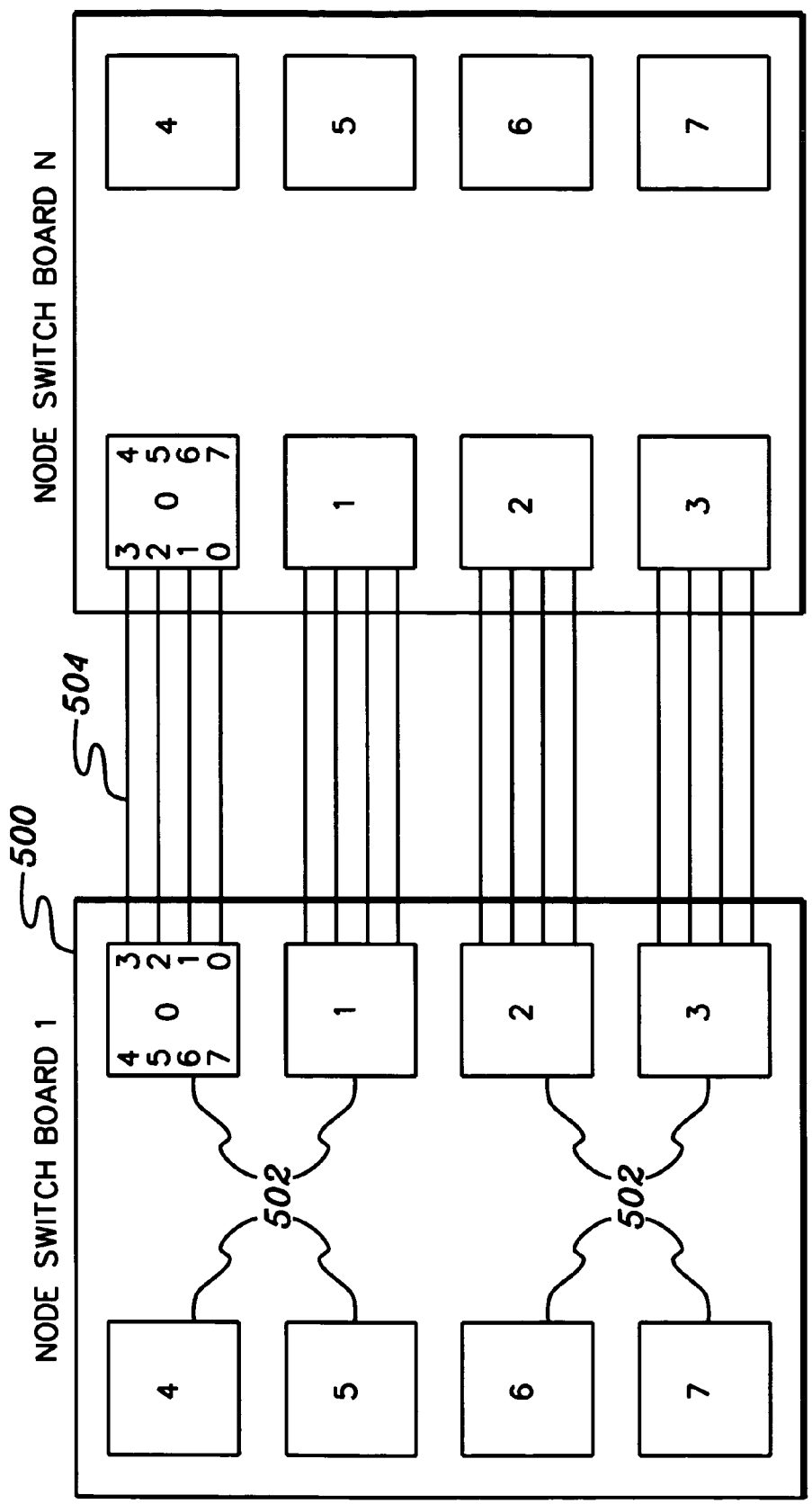
FIG. 5 depicts one example of a single stage network topology, in accordance with an aspect of the present invention.

Network topologies can include networks with single stage or multiple stage switch boards. A network with a single stage topology has node switch boards (NSBs), which are the switch boards at the edges of the network. As used herein, an edge is a location on the network in which a physical connection may be made (e.g., a port in which a switch cable is plugged into to attach an adapter to a switch chip). As shown in FIG. 5, each node switch board 500 includes a plurality of switch chips 502, which are interconnected (not shown) with one another via switch chip ports 4-7. Additionally, switch boards may be coupled to one another via connections, such as connections 504, that are between external ports 0-3 of the switch chips. For clarity purposes, many connections internal and external to the switch boards are not shown.

Figure 6:
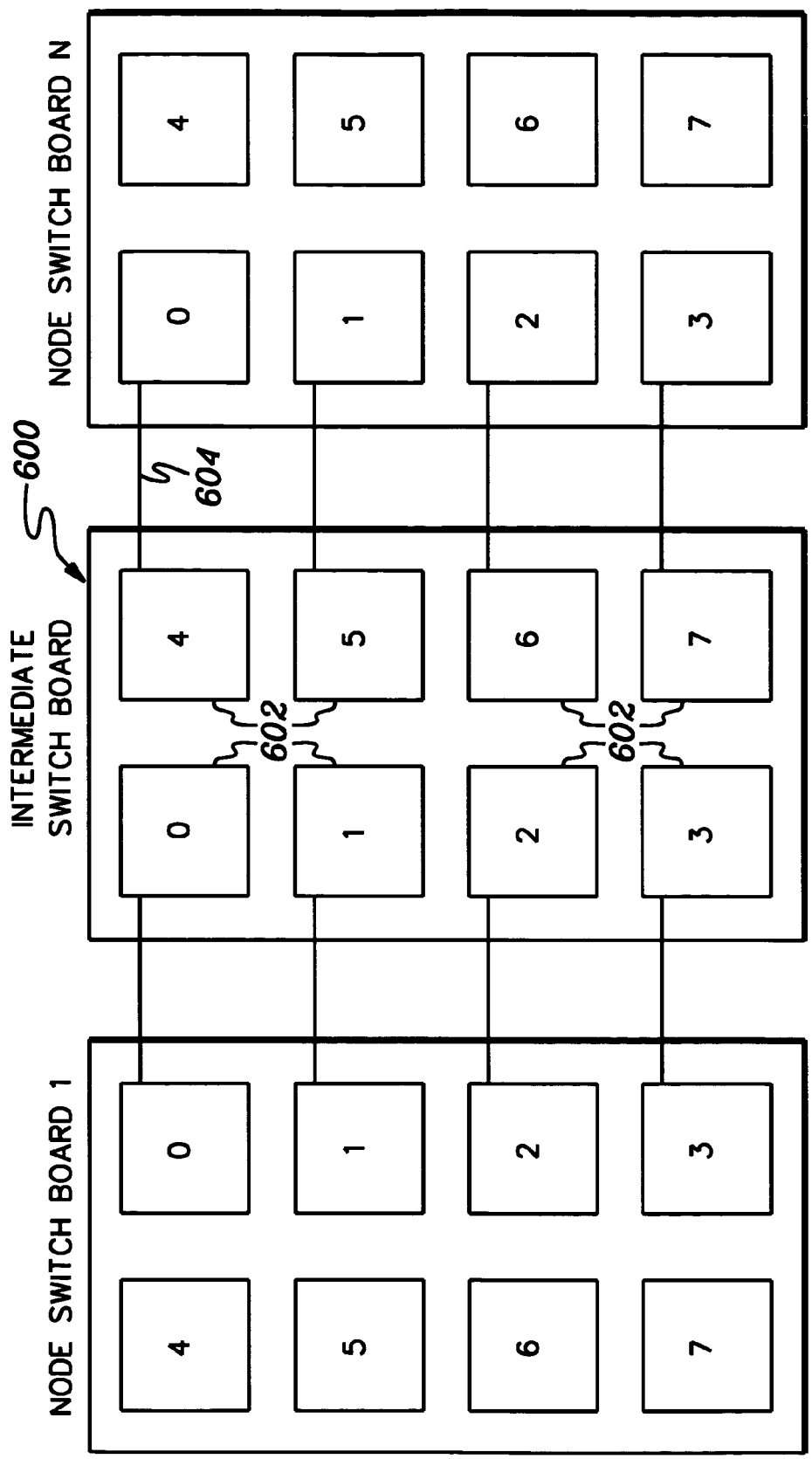
FIG. 6 depicts one example of a two-stage network topology, in accordance with an aspect of the present invention.

In a two stage topology, in addition to node switch boards (NSBs), there are intermediate switch boards (ISBs). Similar to node switch boards, an intermediate switch board 600 (FIG. 6) includes a plurality of switch chips 602, each having a plurality of ports. The switch chips of an intermediate switch port may be connected to one another (not shown), as well as externally connected to other intermediate switch boards and/or to node switch boards. One such connection is depicted as 604. For clarity purposes, the many connections internal to the switch boards and external thereto are not shown.

In the examples described herein, adapters are connected to node switch boards. The locations where the adapters connect to the node switch boards are the endpoints of the network and are the locations for which the network manager creates endpoint identifiers.

Each switch board has a unique number 1–N assigned thereto by the network manager (or other software) during system configuration. The network manager assigns switch board numbers (1 to I) to the intermediate switch boards and (I+1 to N) to the node switch boards. After switch board numbers have been assigned, the identifiers associated with the endpoints of the network are computed using, for instance, the following equation: $(((chip-4)\times 4)+port)+((switch\_number-(number\_of\_ISBs+1))\times 16)$, wherein chip is the switch chip identifier; port represents the port id assigned by the switch hardware; and the switch_number is the switch board number.

The endpoint identifier that this equation provides is unique in the switch network, since the switch board number is unique. Although a given equation is employed to assign endpoint identifiers, many other equations and/or techniques may be used without departing from the spirit of the present invention.

Figure 7:
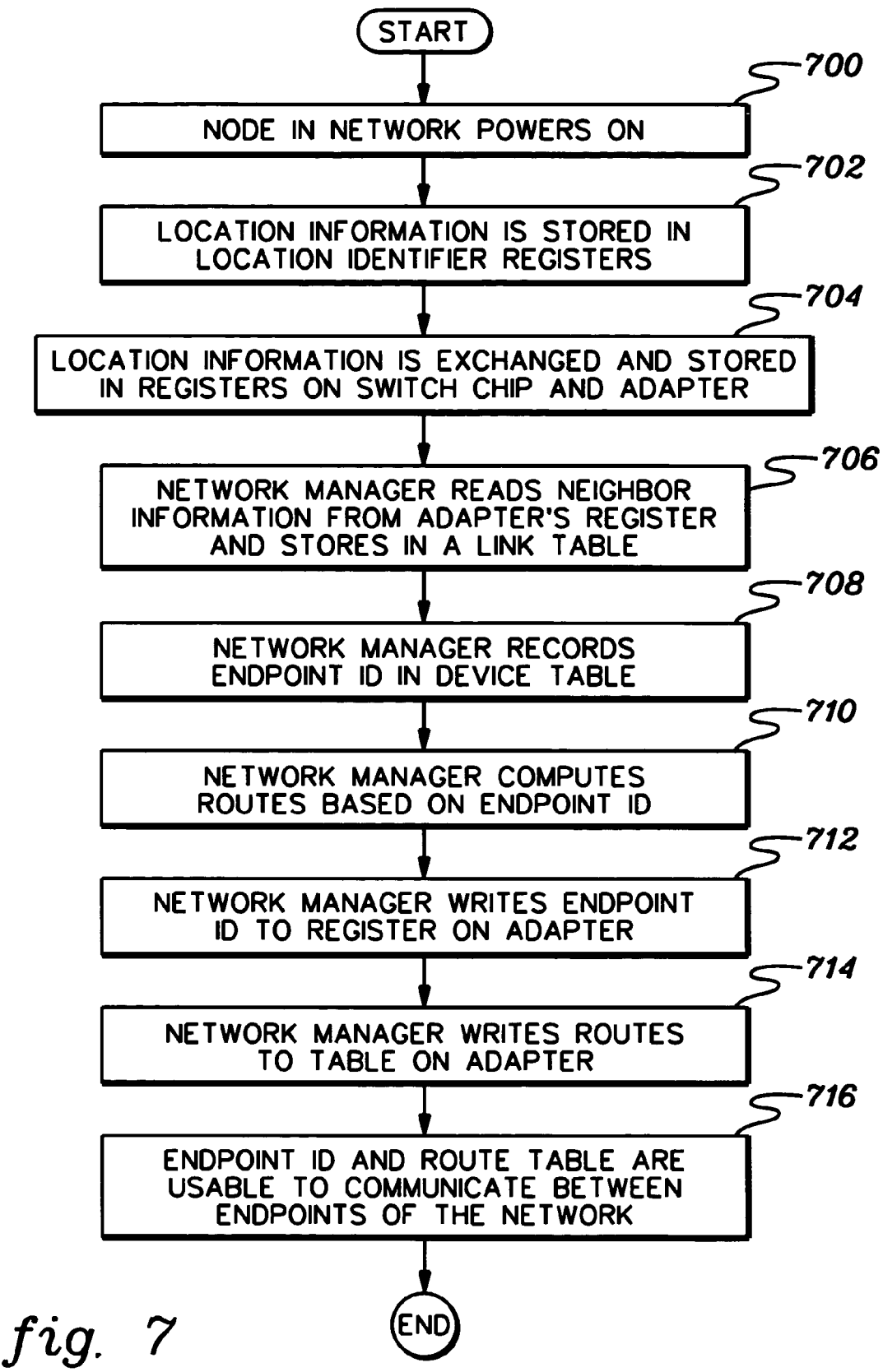
FIG. 7 depicts one embodiment of the logic associated with initially assigning endpoint identifiers, in accordance with an aspect of the present invention.

The endpoint identifiers are used during node power on to compute routes used for communication, as described with reference to FIG. 7. Referring to FIG. 7, as a node in the network powers on, STEP 700, the network manager writes adapter location information to the location identifier register on each of the node's adapters, STEP 702. Again, this location information includes frame id, cage or slot id within the frame, and adapter number within the central processing complex. Additionally, during node power on, when the adapter-to-switch link becomes active (e.g., times), the location information from the switch port and the adapter is automatically exchanged across the link and is stored in hardware registers on the adapter and on the switch chip (e.g., the neighbor registers), STEP 704. For instance, as an adapter-to-switch link connecting Adapter 0 to Switch Chip 0 of Switch Board 1 becomes active, the switch firmware of Switch Board 1 retrieves the location information stored in the location register of the port to which the cable is connected and sends this information to Adapter 0, which is stored in the neighbor register at Adapter 0. Similarly, Adapter 0 sends its location information to Switch Chip 0 and it is stored in the neighbor register of the port to which it is connected.

The network manager reads the neighbor information from the neighbor register of each of the adapters and stores this information in the link table, STEP 706. Thus, the link table includes location information for each port connected to an adapter. The adapters' switch board neighbors are endpoints on the switch network and define the endpoint identifier for each adapter in the node. The network manager records in the device table the fact that this endpoint identifier is assigned to the adapter connected to the particular endpoint on the network, STEP 708.

Additionally, the network manager computes the routes through the network based on the endpoint identifier, STEP 710. One example for computing the routes is described in a U.S. Patent Application, entitled "Divide And Conquer Route Generation Technique For Distributed Selection Of Routes Within A Multi-Path Network," Aruna V. Ramanan, filed May 31, 2005, Ser. No. 11/141,185, which is hereby incorporated herein by reference in its entirety.

Subsequently, the network manager writes the endpoint identifier to an endpoint identifier register on the adapter, STEP 712, and writes the newly computed routes to a hardware route table on the adapter, STEP 714. The endpoint identifier and route table are then usable by the adapter microcode and user-level protocols to send packets between any two endpoints of the network, STEP 716.

The switch microcode polls the connection status of each port on the switch. This polling does not perturb active jobs. The switch port goes inactive, when a cable is removed, and reactivates when the cable is replugged. When a cable is replugged (e.g., plugged into a port), information is exchanged, as described with reference to FIG. 8.

Figure 8:
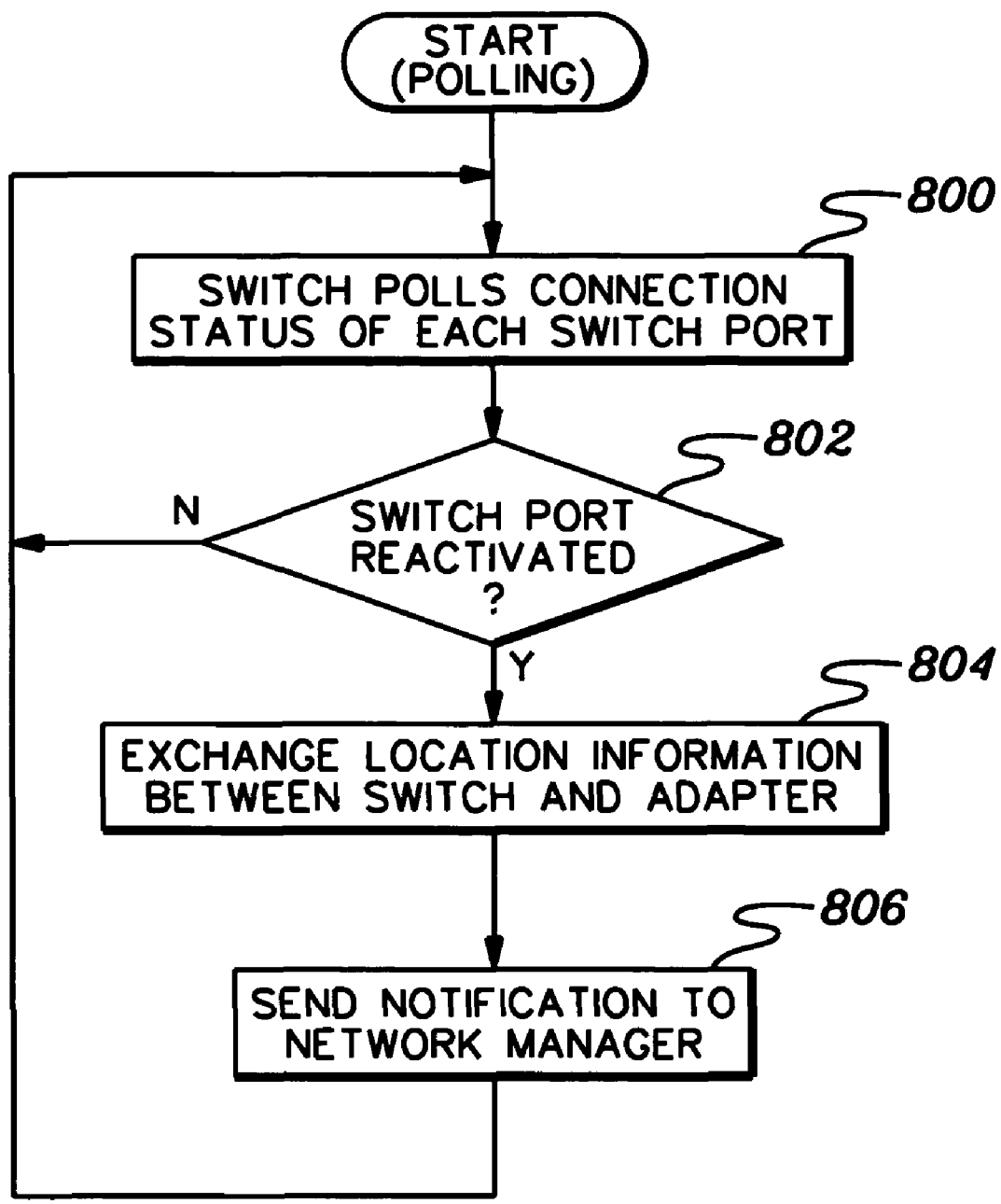
FIG. 8 depicts one embodiment of the logic associated with detecting a change in connection status for switch ports of the switch network, in accordance with an aspect of the present invention.

Referring to FIG. 8, initially, the switch microcode (e.g., firmware) polls the connection status of each switch port, STEP 800. If a port is reactivated by plugging a cable into the port, INQUIRY 802, then location information is automatically exchanged between the switch and adapter, STEP 804. That is, the contents of the location identifier register flows across the link to the adapter, when the link becomes active. The adapter microcode stores this information in its neighbor register. Similarly, the location identifier flows from the adapter to the neighbor register of the switch, when the link becomes active. The switch microcode stores it in the port's neighbor register.

Further, the switch microcode detects the reactivation of the switch port, and sends a notification to the switch network manager, STEP 806. Thereafter, or if a switch port has not been reactivated, processing continues to poll the connection status.

Figure 9:
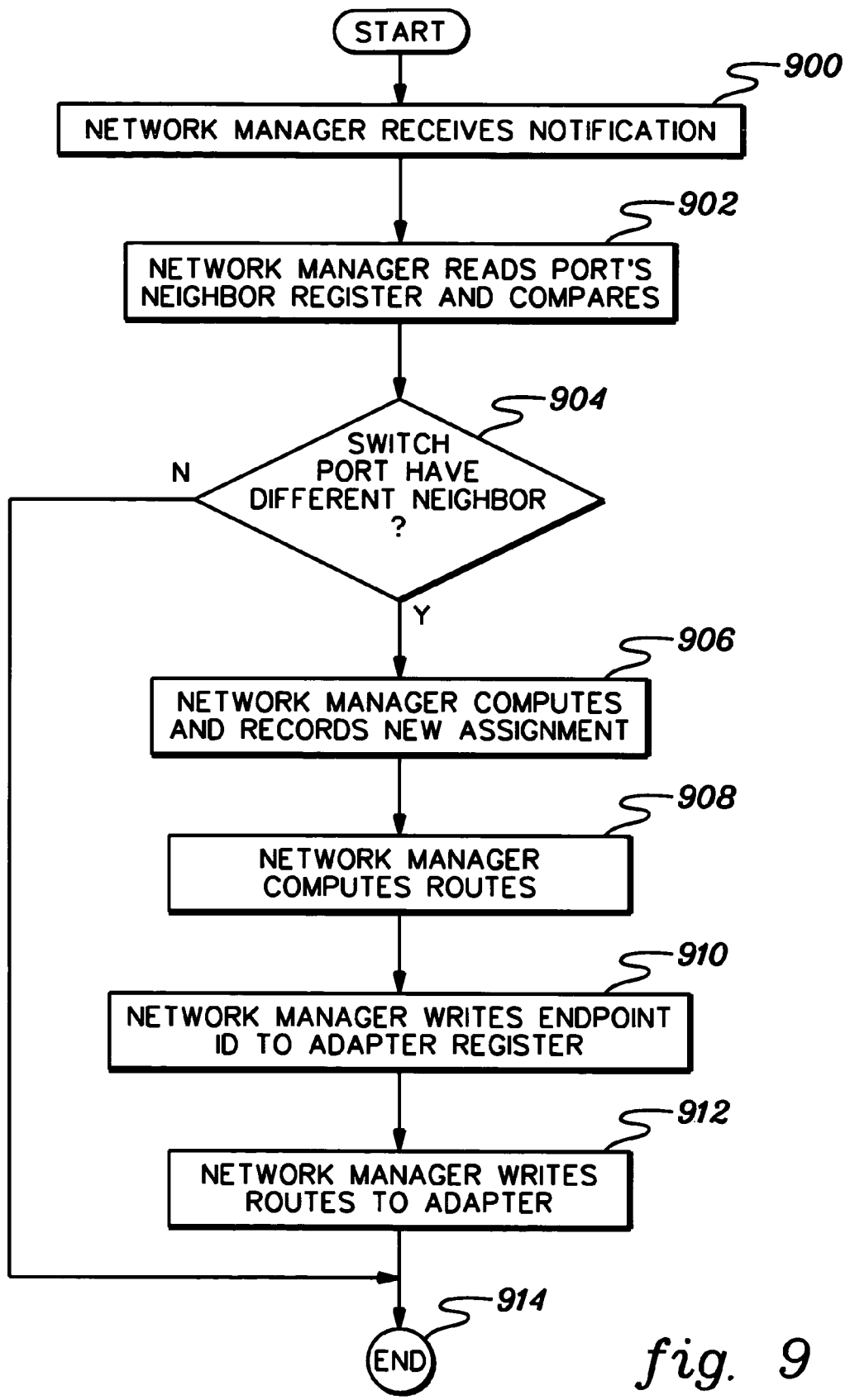
FIG. 9 depicts one embodiment of the logic associated with dynamically reassigning endpoint identifiers, in accordance with an aspect of the present invention.

When the network manager receives the notification, processing continues as described with reference to FIG. 9. Initially, the network manager receives the notification, STEP 900, and determines whether the port has a new neighbor (i.e., is it connected to a different adapter than previously). To make this determination, the network manager reads the neighbor information from the switch port's neighbor register and makes a comparison to the information stored in the link table for that port, STEP 902. If the switch port has a different neighbor (e.g., a different adapter to which it is plugged), INQUIRY 904, then the network manager computes a new endpoint identifier using, for instance, the above equation, and records in the device table the fact that this new endpoint identifier is assigned to the adapter connected to the particular endpoint on the network, STEP 906.

Additionally, the network manager computes the routes for the affected adapter, STEP 908, and writes the endpoint id to the endpoint identifier register on the adapter, STEP 910. Moreover, the network manager updates the link table and writes the newly-computed routes to the hardware route table on the adapter, STEP 912. Thereafter, or if the switch port does not have a different neighbor, then processing is complete, STEP 914.

Described in detail above is a capability for dynamically assigning endpoint identifiers to adapters of a communications network. Advantageously, this capability does not require static endpoint identifier assignment and enables the identifiers to be changed as the physical connections (e.g., cables) are changed (i.e., dynamic assignment). This eliminates the need to update many of the route tables and simplifies processing, as well as network maintenance. The only route table that is updated is the one local to the network interface being affected by the physical connection change. A consistent view is provided to the other adapters. Advantageously, aspects of the present invention work for different types of networks including, but not limited to, optical, copper, phototonic networks or a combination thereof, as well as others.

One or more aspects of the present invention can be included in an article of manufacture (e.g., one or more computer program products) having, for instance, non-transitory computer readable storage media. The media has therein, for instance, computer readable program code means or logic (e.g., instructions, code, commands, etc.) to provide or facilitate the capabilities of the present invention. The article of manufacture can be included as a part of a computer system or sold separately.

Figure 10:
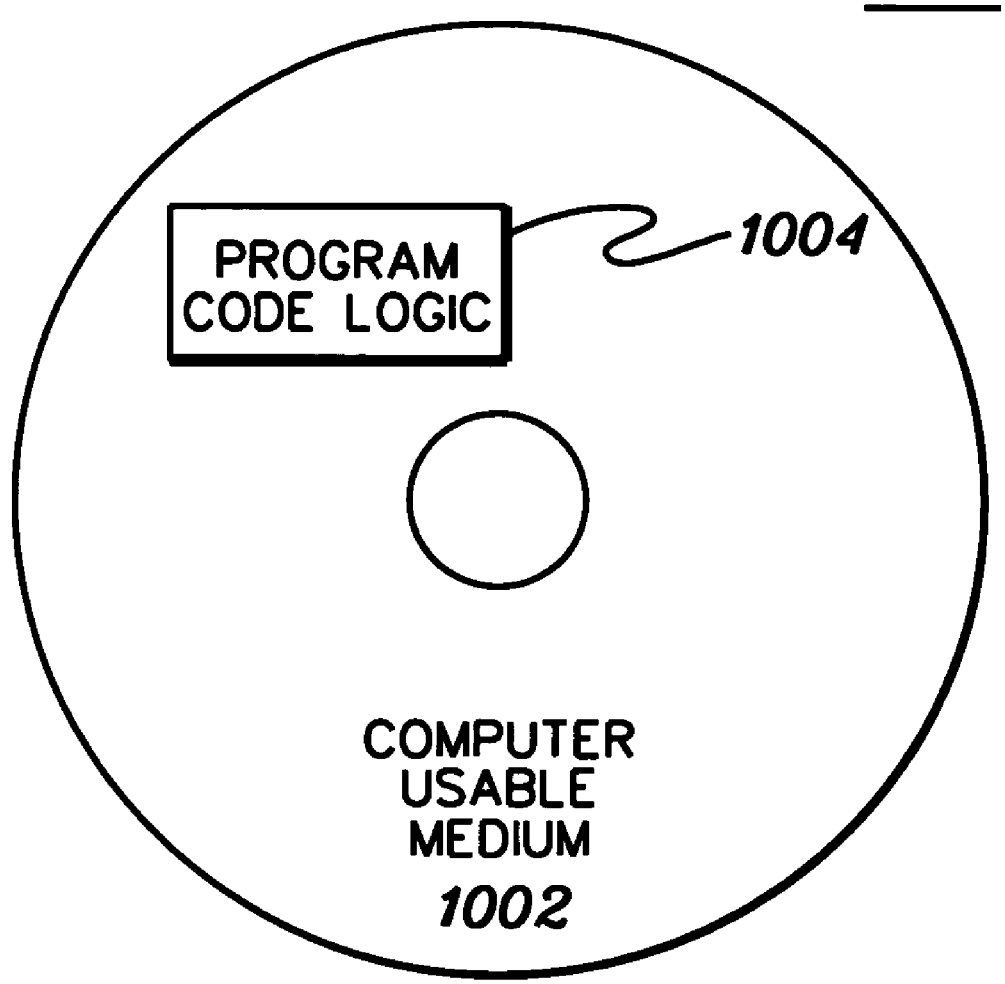
FIG. 10 depicts one embodiment of a computer program product embodying one or more aspects of the present invention.

One example of an article of manufacture or a computer program product incorporating one or more aspects of the present invention is described with reference to FIG. 10. A computer program product 1000 includes, for instance, one or more computer readable storage media 1002, such as, a floppy disk, a high capacity read-only memory in the form of an optically read compact disk or CD-Rom, a tape, or other recording media. Recording medium 1002 stores computer readable program code means or logic 1004 thereon to provide and facilitate one or more aspects of the present invention.

A sequence of program instructions or a logical assembly of one or more interrelated modules defined by one or more computer readable program code means or logic direct components of the service network and/or switch network to perform one or more aspects of the present invention.

The capabilities of one or more aspects of the present invention can be implemented in software, firmware, hardware or some combination thereof. At least one program storage device readable by a machine embodying at least one program of instructions executable by the machine to perform the capabilities of the present invention can be provided.

Although examples are described herein, many variations to these examples may be provided without departing from the spirit of the present invention. For instance, switch networks other than the high performance switch network offered by International Business Machines Corporation, may benefit from one or more aspects of the present invention. Similarly, other types of networks, including those networks that store route tables on their interfaces, may benefit from one or more aspects of the present invention. Further, the switch network described herein may include more, less or different devices than described herein. For instance, it may include less, more or different nodes than described herein, as well as less, more or different switch frames than that described herein. Additionally, the links, adapters, switches and/or other devices or components described herein may be different than that described and there may be more or less of them. Further, the service network may include less, additional or different components than that described herein.

In yet other embodiments, components other than network managers may perform one or more aspects of the present invention. Further, the network manager may be a part of the communications network, separate therefrom or a combination thereof. Yet further, the data structure described herein may be other than tables and/or may include different, more or less information. Further, they may be maintained outside of the network manager process.

Additionally, the network can be in a different environment than that described herein. These and other variations are considered to be included within the scope of the claimed invention.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of assigning endpoint identifiers to network interfaces of a communications network, said method comprising:
    providing the communications network with a network interface having a first endpoint identifier assigned thereto, said first endpoint identifier being a unique identifier assigned to the network interface based on physical location of a port of the communications network to which the network interface is connected, wherein the first endpoint identifier is computed using an equation, said equation using at least one mathematical operator to mathematically combine an identifier of the port to which the network interface is connected and an identifier of a chip comprising the port to which the network interface is connected, wherein the chip is part of a switch board of the communications network;
    dynamically assigning, by a network manager of a communications network by a processor, a second endpoint identifier to the network interface, in response to physically moving the network interface from the port to another port of the communications network, the another port being different from the one port, said second endpoint identifier being different than the first endpoint identifier and being based on a new physical location of the network interface, said second endpoint identifier being computed using the equation, said equation using at least one mathematical operator to mathematically combine an identifier of the another port and an identifier of a chip comprising the another port; and
    wherein the equation to compute at least one of the first endpoint identifier or the second endpoint identifier is a function of the identifier of the respective port, the identifier of the chip comprising that port, the identifier of the switch board comprising the chip comprising that port, and a number of intermediate switch boards in the communications network, and the equation to compute at least one of the first endpoint identifier or the second endpoint identifier comprises, in part, (the identifier of the switch board)−(the number of intermediate switch boards+1).

2. The method of claim 1, wherein the dynamically assigning comprises:
    computing, by the network manager, the second endpoint identifier based on location of the another port; and
    storing, by the network manager, the second endpoint identifier in a register on the network interface.

3. The method of claim 2, wherein the communications network comprises a switch network, the network interface comprises an adapter of a node of the switch network, the port comprises a port of the switch network, and the another port comprises another port of the switch network.

4. The method of claim 1, further comprising detecting a change in physical connection, and wherein the dynamically assigning occurs automatically, in response to detecting the change.

5. The method of claim 4, wherein said detecting comprises comparing neighbor information of the another port to information of the another port obtained prior to the change to determine that the network interface is now connected to the another port.

6. The method of claim 5, wherein the neighbor information is maintained in a neighbor register of the chip comprising said another port, and said information of the another port is maintained in a data structure.

7. The method of claim 4, wherein the detecting occurs in response to an automatic notification received indicating that the another port has reactivated.

8. The method of claim 1, wherein the second endpoint identifier replaces the first endpoint identifier.

9. The method of claim 8, wherein the second endpoint identifier is stored in a register of the network interface.

10. A system of assigning endpoint identifiers to network interfaces of a communications network, said system comprising:
    a network interface having a first endpoint identifier assigned thereto, said first endpoint identifier being a unique identifier assigned to the network interface based on physical location of a port of the communications network to which the network interface is connected, wherein the first endpoint identifier is computed using an equation, said equation using at least one mathematical operator to mathematically combine an identifier of the port to which the network interface is connected and an identifier of a chip comprising the port to which the network interface is connected, wherein the chip is part of a switch board of the communications network, to compute the first endpoint identifier;
    a network manager of the communications network the network manager dynamically assigning a second endpoint identifier to the network interface, in response to a physical move of the network interface from the port to another port of the communications network, wherein the another port is different from the one port, and wherein said second endpoint identifier is different than the first endpoint identifier and is based on a new physical location of the network interface, said second endpoint identifier being computed using the equation, said equation using at least one mathematical operation to mathematically combine an identifier of the another port and an identifier of a chip comprising the another port; and
    wherein the equation to compute at least one of the first endpoint identifier or the second endpoint identifier is a configuration of the identifier of the respective port, the identifier of the chip comprising that port, the identifier of the switch board comprising the chip comprising that port, and a number of intermediate switch boards in the communications network, and the equation to compute at least one of the first endpoint identifier or the second endpoint identifier comprises, in part, (the identifier of the switch board)−(the number of intermediate switch boards+1).

11. The system of claim 10, wherein the network manager: computes the second endpoint identifier based on location of the another port; and
stores the second endpoint identifier in a register on the network interface.

12. The system of claim 10, wherein the network manager compares neighbor information of the another port to information of the another port obtained prior to the change to determine that the network interface is now connected to the another port and is to have the second identifier assigned thereto.

13. A computer program product for assigning endpoint identifiers to network interfaces of a communications network, the computer program product comprising:
    a non-transitory storage medium readable by a processing circuit and storing instructions for execution by the processing circuit for performing a method comprising:
        recognizing a network interface of a communications network having a first endpoint identifier assigned thereto, said first endpoint identifier being a unique identifier assigned to the network interface based on physical location of a port of the communications network to which the network interface is connected, wherein the first endpoint identifier is computed using an equation, said equation using at least one mathematical operator to mathematically combine an identifier of the port to which the network interface is connected and an identifier of a chip comprising the port to which the network interface is connected, wherein the chip is part of a switch board of the communications network, to compute the first endpoint identifier;
        dynamically assigning a second endpoint identifier to the network interface, in response to a physical move of the network interface from the port to another port of the communications network, the another port being different from the one port, and wherein the second endpoint identifier is based on a new physical location of the network interface, said second endpoint identifier being computed using the equation, said equation using at least one mathematical operator to mathematically combine an identifier of the another port and an identifier of a chip comprising the another port; and
    wherein the equation to compute at least one of the first endpoint identifier or the second endpoint identifier is a function of the identifier of the respective port, the identifier of the chip comprising that port, the identifier of the switch board comprising the chip comprising that port, and a number of intermediate switch boards in the communications network, and the equation to compute at least one of the first endpoint identifier or the second endpoint identifier comprises, in part, (the identifier of the switch board)−(the number of intermediate switch boards+1).

14. The computer program product of claim 13, wherein the dynamically assigning comprises:
    computing the second endpoint identifier based on location of the another port; and
    storing the second endpoint identifier in a register on the network interface.

15. The computer program product of claim 13, further comprising detecting a change in physical connection, and wherein the dynamically assigning occurs automatically, in response to detecting the change.

16. The computer program product of claim 15, wherein said detecting comprises comparing neighbor information of the another port to information of the another port obtained prior to the change to determine that the network interface is now connected to the another port.

17. The method of claim 1, wherein the network manager assigns identifiers to the ports, identifiers to the chips and identifiers to the switches of the communications network and uses at least some of the assigned identifiers in the assigning at least one of the first endpoint identifier or the second endpoint identifier.

18. The method of claim 1, wherein the equation to compute at least one of the first endpoint identifier or the second endpoint identifier comprises $(((chip-A) \times B) + port) + ((switch\ number - (number\ of\ intermediate\ switch\ boards + 1)) \times C)$, wherein chip is the identifier of the chip, port is the identifier of the port, switch number is the number of the switch board, number of intermediate switch boards is the number of intermediate switch boards of the communications network comprising the port, A is a first numeric value, B is a second numeric value, and C is a third numeric value.

19. The method of claim 18, wherein A is 4, B is 4 and C is 16.

* * * * *